US007171558B1

(12) United States Patent
Mourad et al.

(10) Patent No.: US 7,171,558 B1
(45) Date of Patent: Jan. 30, 2007

(54) TRANSPARENT DIGITAL RIGHTS MANAGEMENT FOR EXTENDIBLE CONTENT VIEWERS

(75) Inventors: Magda M. Mourad, Yorktown Heights, NY (US); Jonathan P. Munson, Chapel Hill, NC (US); Tamer Nadeem, College Park, MD (US); Giovanni Pacifici, New York, NY (US); Marco Pistoia, Yorktown Heights, NY (US); Alaa S. Youssef, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 09/667,286

(22) Filed: Sep. 22, 2000

(51) Int. Cl.
*H04L 9/00* (2006.01)

(52) U.S. Cl. ...................... 713/168; 713/156; 713/157; 705/53

(58) Field of Classification Search ................ 713/178, 713/201, 100, 168, 193, 156–157, 175; 704/270; 84/609, 600, 649; 380/37, 30; 708/141; 705/1, 75, 26, 51, 59, 53
See application file for complete search history.

(56) References Cited

U.S. PATENT DOCUMENTS

| 5,664,098 | A | 9/1997 | Bianchi et al. | |
|---|---|---|---|---|
| 5,774,551 | A | 6/1998 | Wu et al. | |
| 5,903,721 | A | 5/1999 | Sixtus | |
| 5,958,050 | A | 9/1999 | Griffin et al. | |
| 5,991,399 | A | 11/1999 | Graunke et al. | |
| 6,006,332 | A | 12/1999 | Rabne et al. | ................ 713/201 |
| 6,058,383 | A | 5/2000 | Narasimhalu et al. | |
| 6,081,899 | A | 6/2000 | Byrd | |
| 6,085,320 | A | 7/2000 | Kaliski, Jr. | |
| 6,092,202 | A | 7/2000 | Veil et al. | |
| 6,098,056 | A | 8/2000 | Rusnak et al. | |
| 6,138,119 | A * | 10/2000 | Hall et al. | ...................... 707/9 |
| 6,247,127 | B1 * | 6/2001 | Vandergeest | ................ 713/100 |
| 6,519,700 | B1 * | 2/2003 | Ram et al. | ................... 713/193 |
| 6,611,812 | B2 * | 8/2003 | Hurtado et al. | ............... 705/26 |
| 6,697,944 | B1 * | 2/2004 | Jones et al. | ................. 713/168 |
| 6,775,655 | B1 * | 8/2004 | Peinado et al. | ............... 705/59 |

\* cited by examiner

*Primary Examiner*—Kim Vu
*Assistant Examiner*—T. B. Truong
(74) *Attorney, Agent, or Firm*—Scully, Scott, Murphy & Presser, P.C.; Douglas W. Cameron, Esq.

(57) ABSTRACT

A digital rights management system for controlling the distribution of digital content to player applications. The system comprises a verification system, a trusted content handler, and a user interface control. The verification system is provided to validate the integrity of the player applications; and the trusted content handler is used to decrypt content and to transmit the decrypted content to the player applications, and to enforce usage rights associated with the content. The user interface control module is provided to ensure that users of the player applications are not exposed to actions that violate the usage rights. The preferred embodiment of the present invention provides a system that enables existing content viewers, such as Web browsers, document viewers, and Java Virtual Machines running content-viewing applications, with digital rights management capabilities, in a manner that is transparent to the viewer. Extending content viewers with such capabilities enables and facilitates the free exchange of digital content over open networks, such as the Internet, while protecting the rights of content owners, authors, and distributors. This protection is achieved by controlling access to the content and constraining it according to the rights and privileges granted to the user during the content acquisition phase.

21 Claims, 7 Drawing Sheets

Figure 3: Certification subsystem.

Figure 4: Code Identity verification with Verifying Launcher

COMPONENTS OF TRUSTED CONTENT HANDLER

Figure 6: Components of Trusted Content Handler.

Figure 5: Code Identity verification with In-Call Verifier.

Figure 7: Execution steps followed by TCH to serve a request for a resource.

Figure 8: IE window hierarchy.

Figure 9: End-user registration and client unique key pair generation.

Figure 10: Rights acquisition and personalization.

Figure 11: Lightweight end-to-end DRM-enabled content distribution architecture.

TRANSPARENT DIGITAL RIGHTS MANAGEMENT FOR EXTENDIBLE CONTENT VIEWERS

BACKGROUND OF THE INVENTION

This invention generally relates to digital rights management systems, and more specifically, to a highly flexible and minimally intrusive digital rights management system.

The unprecedented growth of the Internet has made it forceful and persuasive for producers to distribute content to a worldwide audience faster and more efficiently than ever before. While all types of digital content publishers have invested heavily in building their Internet presence, most of them find that they are spending several times more on their Web sites than they are earning from advertising and other revenues. In many cases, digital content publishers find their traditional sources of revenue being eroded by the ability of consumers to obtain information freely and illegally from a publisher's Web site or from newsletters, research reports and similar content delivered via unsecured e-mail.

With conventional technology, regardless of how sophisticated the subscriber and access control systems are, once digital content has left the Web server for a consumer to view or play it, the publisher looses copyright control, as well as any access control restriction enforced on the Web server. Re-use and redistribution are a simple task threatening the very core of publishing as a business. For all its challenges, the Internet represents a vast new marketplace for publishers, as long as they can control the distribution and use of their valuable content through a flexible and minimally intrusive DRM system.

Several DRM systems have appeared on the market in the past few years. In general, all DRM systems allow the distribution of digital contents in an encrypted form. A set of rights is associated with each single piece of content, and only after acquiring the rights of accessing a protected piece of digital content will a user be allowed to decrypt it. Examples for such systems include IBM's EMMS, ContentGuard originally from Xerox, and the Metatrust system from Intertrust.

In a serious DRM system, users are prevented from directly decrypting the contents. The decrypting key is hidden to them. Therefore, they cannot decrypt the contents, save them, and distribute them in a decrypted form, unless they use a certified and tamper-resistant DRM software, which will allow such operations only if those users have acquired the rights to do so.

However, the general approach adopted by the DRM systems commonly available on the market requires the use of a specific player, which is a totally new player (such as a new browser, media player, etc). Users must install such a player in order to access any form of protected content that is downloaded on their machines. This approach may be secure enough to protect copyrighted material, but is highly intrusive, and lacks flexibility. In fact, the fundamental problems associated with this solution are:

Application Dependency

When a DRM system is based on a particular application that is distributed to all the DRM clients, the major problem is that users will be allowed to use only that application if they want to access those contents. Other applications, even if they support that particular type of contents, will not work, because they will be unable to access or calculate the secret decrypting key, and decrypt the contents. This creates a limitation. Many users may want to use their preferred application (such as their favorite browser, with the plug-ins that they have installed on it, or their favorite media player, etc.). Existing applications may be more sophisticated than a DRM player, and end users may experience annoyance from the usage of an imposed application that they may not like.

Content Type Dependency

In the scenario just described, the type of content that may be DRM-protected is limited to that supported by the DRM player. Therefore, it is extremely desirable to DRM-enable not only existing players, but especially those which are considered as universal browsers for virtually all types of content, such as Web browsers.

Interference with Application Development

In this common approach, the DRM capabilities are embedded inside the application used to access and playback the content. This implies that the application developer has to know how to interact with, and access the capabilities of the DRM system. This requirement creates a burden on the application developer and represents a major intrusion on the player application development process.

It is clear, then, that in order to be successful on the market, a DRM system should be flexible and minimally intrusive, and should not put any conditions on the type of the contents that need to be delivered, nor on the applications used to access such contents.

SUMMARY OF THE INVENTION

An object of this invention is to improve digital rights management systems.

Another object of this invention is to provide a digital rights management system that is completely transparent to the player/viewer application running on the client host system.

A further object of the present invention is to provide a digital rights management system that is flexible and minimally intrusive, and that does not put any conditions on the type of the contents that need to be delivered, or on the application used to access such contents.

These and other objectives are attained with a digital rights management system in accordance with this invention. The present invention provides a system that enables existing content viewers, such as Web browsers, document viewers, and Java Virtual Machines running content-viewing applications, with digital rights management capabilities, in a manner that is transparent to the viewer. The term "viewer" is used here in the broader sense to refer to any application used to play-out or render content in any viewable or audible form. Extending content viewers with such capabilities enables and facilitates the free exchange of digital content over open networks, such as the Internet, while protecting the rights of content owners, authors, and distributors. This protection is achieved by controlling access to the content and constraining it according to the rights and privileges granted to the user during the content acquisition phase.

The system disclosed herein achieves content protection and rights enforcement without imposing a certain content viewer, or any special or peculiar requirements on the design of existing viewers. It leverages on prevailing software structuring mechanisms commonly known as component technologies. Most new software systems are composed out of a set of independent components with well-defined interfaces. Such systems are typically extendable by means of adding or replacing some of the components. These are post-installation changes that do not require re-compilation of the software. The system of this invention takes advantage of this aspect of new software systems in order to transparently augment existing Web browsers, or content viewers in general, with rights management capabilities. The system only requires the viewer to be extendible in a very common way; the viewer must provide a mechanism for attaching independently developed content handlers.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
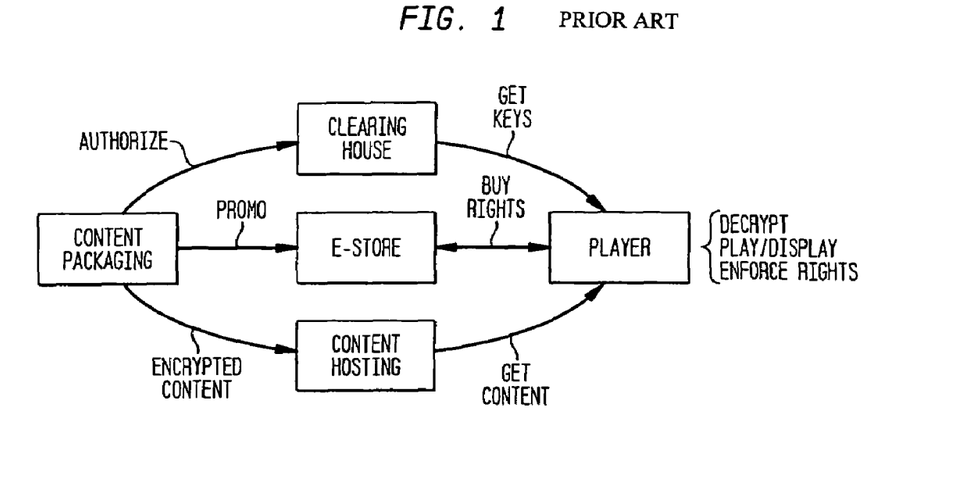
FIG. 1 shows the components of a typical DRM system.

FIG. 1 depicts the components of a typical DRM system. There are five basic components necessary for creating a complete end-to-end DRM-enabled e-commerce platform. These are described briefly below.

Content Packaging

This component is responsible for content encryption and packaging, on the publishing side. Content packaging is the last step in the authoring phase, and ideally the packaging tool should be seamlessly integrated with the authoring tool. The packaging tool could be Web-based with an easy to use user interface that could be manually operated, to specify the content files and rights. Alternatively, the interface between the packaging and authoring tools could be an automated one.

Online e-Store

The e-store represents the only tangible interface between the end-user and the entire system. The e-store is responsible for advertising the content, for accepting payments and most importantly for generating authorization tokens (certificates) that include the purchased rights.

Content Hosting

This component is responsible for hosting the encrypted content packages and releasing them only to authorized users, who have acquired the rights to download the content. Logically separating this component from the rest of the system allows for flexibility and independence of the distribution channel used.

Clearinghouse

This component is responsible for personalizing the keys for decrypting the content for each individual user. It is also the locus of authorization and usage tracking. In general, the Clearinghouse is the only component that is trusted by all parties (content owners/publishers, distributors, and consumers).

Player/Viewer

This component runs on the client side and encapsulates the DRM client. The DRM client is responsible for accessing the content, interactions with the Clearinghouse, maintaining the content encrypted using keys hidden from the user at all times, and for enforcing the usage conditions associated with the content. Traditionally, the DRM client has been always embedded inside a customized player/viewer, and the two modules together form one trusted application that is installed on the client machine. The protected content could not be rendered using any other player/viewer.

In order to avoid the above-mentioned drawbacks of existing DRM systems, and to achieve the desired flexibility and minimal intrusion in the DRM system design, the present invention introduces a novel approach to supporting DRM requirements on the client side. The new approach is completely transparent to the player/viewer application running on the client host system. By application transparency, we mean that the DRM system does not interfere with the application development phase at all. In fact, the application developer need not be aware that her application will be used to render protected content. Additionally, transparent DRM extensions can be added to any extendible content viewer, hence eliminating dependency on a particular viewer application or content type.

Figure 2:
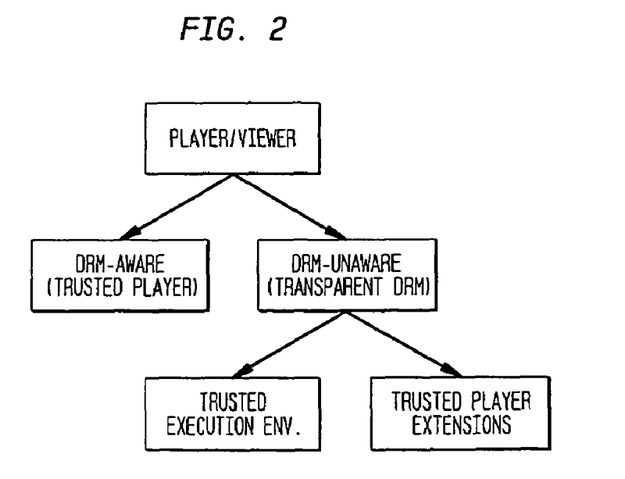
FIG. 2 presents a taxonomy of DRM-enabled client systems, classified based on the level of client awareness of DRM enablement.

Transparent DRM support to player applications can be achieved by securing the execution environment in which the player runs, e.g., providing a DRM-enabled Java Virtual Machine on top of which non-modified Java players execute. Alternatively, a transparent DRM system can be implemented by providing application extension components, which are dynamically linked to the application at run-time, e.g., extending a Web browser by means of a trusted protocol handler. The latter is the approach used by this invention. FIG. 2, presents a taxonomy of DRM-enabled client systems, classified based on the level of client awareness of DRM enablement.

While the two approaches for achieving transparent DRM support seem to be different, they both share inherent similarities, since the former approach (securing the execution environment of the players) can be achieved by means of transparent DRM extensions to the execution environment itself.

The invented system has three main components: a verification system, a trusted content handler, and a user interface control module. While the trusted content handler performs the main tasks of content decryption and feed to the player, and enforcement of usage rights associated with the content, it relies heavily on the module verification system in order to validate the integrity of the player application which ultimately consumes the decrypted content. On the other hand, the user interface control module ensures that the application user interface does not expose to the user any actions, which may violate the usage rights. The trusted content handler, together with the user interface control module, constitutes the transparent DRM extensions to the original client application. Each of the three main components of the system is detailed below.

Code Integrity Verification and Authentication

In certain computer software applications, it is desirable to be able to verify certain properties of programs that are executing or that are about to execute. Such properties may include the fact that a program will safely handle digital content entrusted to it, or that it will self-limit its resource consumption. Since it is computationally impossible to verify whether a given executable has or does not have a particular property, in general, automatic verification of the property at execution time cannot be used. An alternative technique is to utilize a system for "offline" verification, in which a third party, a "certifier," guarantees that a program has a particular property. The certifier's verification techniques may consist of manual inspection of program source code, or may simply rely on a legal agreement between the certifier and the software developer.

Once a program has been verified through the offline procedure to have a certain property, a digital "trust certificate" is generated that attests to this. To verify a property of a program at the time the program is loaded or at other times while the program is executing, a verification system may then test the integrity of the executing code and verify that it is identical to the one certified to have the desired property. In addition, the verification system must authenticate the executing code each time a critical resource is requested, to ensure that only the verified code has access to such resources. The invention disclosed herein is able to do so in a secure manner. In particular, the present invention addresses the problem of communicating the "trustedness" of a program, at runtime, among different trusted modules in a system. This invention has an advantage over other techniques in that it does not require the application to participate in the verification process, and requires only minimal participation from the application developers.

While using the same cryptographic techniques as code-signing mechanisms such as Java JAR files or Microsoft's Authenticode, this invention differs from code-signing in that, rather than protecting the user's system from malicious code, the system of this invention protects certain resources from unauthorized access.

The code identity verification system includes a certification subsystem, and a verification subsystem. The certification subsystem is used to generate and store a Trust Certificate, while the verification subsystem tests for the presence of a Trust Certificate validating the integrity of the code at program execution time. The verification subsystem also verifies the code identity with every request made to access critical or protected resources that cannot be accessed except by certified programs.

This invention identifies two mechanisms for verifying that viewers using the TCH are trusted to safely handle protected content. In each mechanism, trusted viewers must undergo an offline certification process, which results in a trust certificate that includes the signed digest(s) of the application code modules. In one mechanism, the viewer code modules are verified before they are loaded into memory and allowed to execute; in the other mechanism, the code modules are verified upon the first call to the TCH. The first mechanism is known as the Verifying Launcher. The second is known as the In-Call Verifier.

Certification Subsystem

Figure 3:
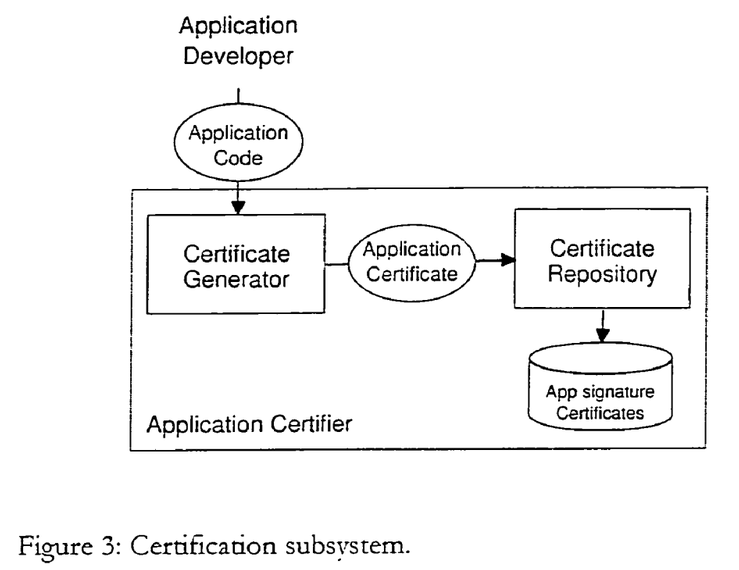
FIG. 3 shows the essential elements of the preferred certification system used in this invention.

FIG. 3 shows the essential elements of the certification system. The certification system includes a Certificate Generator (1) and a Certificate Repository (2). To obtain trust certification for their applications, application developers submit their applications (3) to the Certificate Generator (CG), in the same form as they will be distributed to end-users. If the operators of the CG decide that the application exhibits the property for which the Trust Certificate is desired (using whatever process they choose) the CG produces a Trust Certificate and stores it in the Certificate Repository (CR).

The form of the Trust Certificate (TC) is as follows.

Program Identifier

This is a string that identifies the program with the previous code digest. This may be a hierarchical name such as "Microsoft/Internet Explorer/5.01."

Property Name

This is a string that identifies precisely what is being certified by this certificate. For example: "IBM Rights Manager Trusted."

Code Digest(s)

This is created with a conventional message digest function such as MD5 or SHA. There will be a digest for each application module that exists in a separate file.

Digital Signature

This is the digital signature of the TC, using the secret key of the Application Certifier.

Certifier Identification

This is a conventional digital certificate containing the public key of the Application Certifier, signed by a public certificate authority. The TC may contain other elements such as date, certificate version, and cryptography parameters.

Code Identity Verification with Verifying Launcher

This mechanism relies on a verifying launcher (VL), which is responsible for verifying that the viewer is certified as a trusted application for safely handling protected content entrusted to it. As mentioned above, each trusted viewer must undergo an offline certification process, which results in a trust certificate that includes the signed digest(s) of the application code modules. Before launching the viewer, VL verifies the integrity of the code. This is done by applying a message digest algorithm to the code module in question and comparing the result to the pre-signed digest. An exact match means that the code installed on the client host is identical to the one certified, and hence is safe to handle the content. VL then instructs the operating system to load the application from the verified code files. By virtue of its role as the application launcher, VL obtains OS-specific information, such as the process ID or the process creation date, that uniquely identifies the loaded application instance within the system. VL uses this information to compute a stamp that still uniquely identifies the application instance but is hard to guess or forge. The stamp is computed using a deterministic hashing function, which is known to TCH as well.

Figure 4:
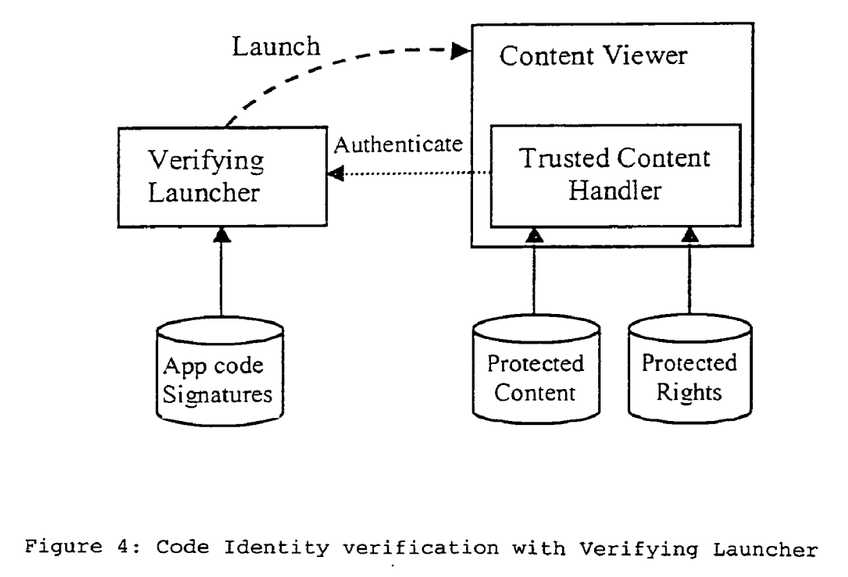
FIG. 4 illustrates a code identity verification with verifying launcher.
Figure 5:
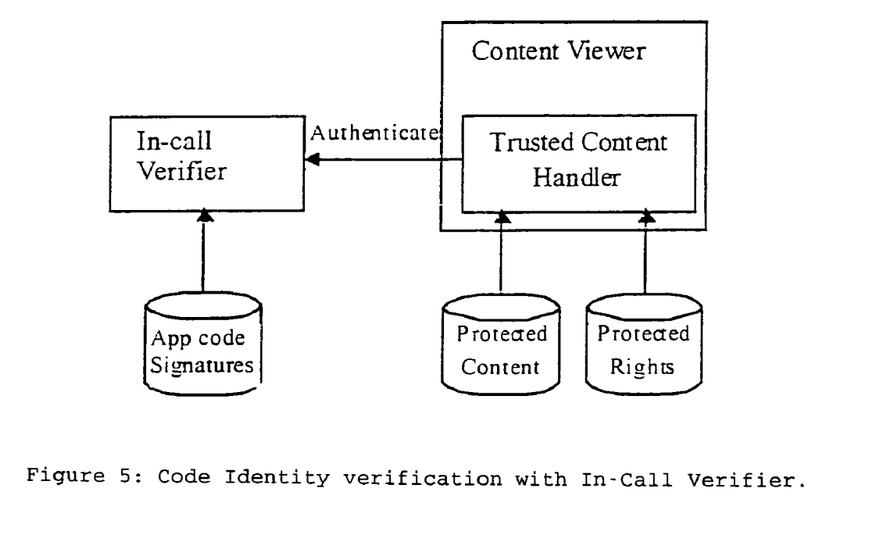
FIG. 5 shows a code identity verification with in-call verifier.

FIG. 4 shows the out-of-process verification subsystem. The procedure for an application to use the Trusted Library is as follows:

1. The user invokes the Verifying Launcher (VL) and requests it to load the Application by passing to the VL the name of the application to load and the name of the executable file containing the application. (Alternatively, given the name of the application, the VL may locate its code through an application registry if one is available.) Invocation of the VL is done through the normal means provided by the host operating system. For example, the user may double-click on a file with an extension that is registered to the VL, and which also indicates the application to load.

2. Given the unique name of the application, the VL looks up the associated certificate in its Certificate Cache, or from the Certificate Repository if the needed certificate does not exist in the cache. If the VL must go to the repository, it will store the returned certificate in its cache. If a certificate is not found in either the cache or the repository, the VL exits without loading the application.
3. The VL reads the file(s) of the application's executable code (the files to read are indicated in the certificate) and computes the code digest(s) using the same digest function as used by the certification system.
4. The VL compares each computed digest with the corresponding digest in the certificate. If any of the digests differ, the VL exits without loading the application.
5. If all computed digests match the digests in the certificate, the VL requests the host operating system to load the application. The VL then computes a stamp for the application. A stamp is an arbitrarily long sequence of bits that uniquely identifies an application instance executing in a process. The stamp's length is such that it is infeasible for an unverified application to impersonate a verified application by merely guessing the stamp value. A 1024-bit stamp should be sufficient for most purposes. The VL computes the stamp by using a piece of operating-system-supplied information that uniquely identifies the application instance within the system, such as the process ID or the process creation date. With this data, the VL generates a stamp by "scrambling" the data through a deterministic algorithm. The algorithm must be also be id empotent (always generating the same result given the same inputs), for reasons described below. One such algorithm may be a common encryption algorithm using a predetermined key. The VL then stores the stamp in internal memory.
6. When an application makes a call on the Trusted Content Handler (TCH) to access a protected resource, the TCH first verifies that the application was launched and verified by the VL. It does this by computing the stamp for the application using the same uniquely identifying information and scrambling information that the VL did, and then sending the stamp to the VL for comparison. If the TCH-computed stamp and the VL-computed stamp are the same, then the TCH was called by the same application instance that the VL launched. The TCH may then cache its stamp so that no further communication with the VL is necessary, for this session with the application. The TCH and the VL are assumed to communicate through a secure mechanism. Most modern operating systems provide such mechanisms.

Code Identity Verification with In-Call Verifier

This mechanism relies on an In-Call Verifier (ICV). The ICV uses the same off-line, signature-based certification as the Verifying Launcher, but performs the code integrity check at the time of the first call upon the TCH. Using the process ID supplied to it by the TCH, the ICV makes a system service call to the host operating system to query it for the filenames of the modules that are currently loaded for the given process ID. This mechanism relies on the availability of such a system service. The Windows NT and Windows 2000 operating systems have this service, in the form of performance-related information kept in the system registry for each process. Having the filenames of all modules loaded for the process, the ICV computes the file message digests and compares them with the digests in the corresponding trust certificate.

Trusted Content Handler

Figure 6:
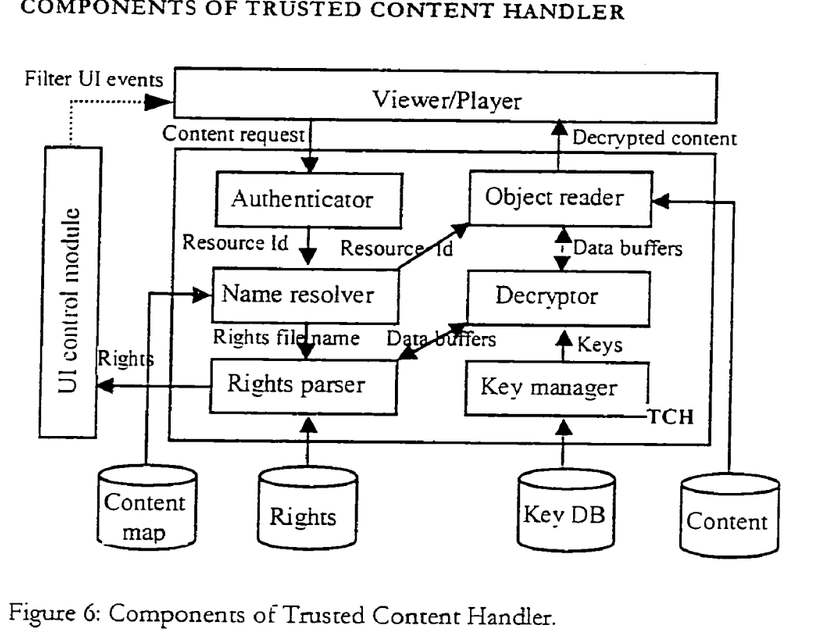
FIG. 6 shows the components of a trusted content handler that may be used in this invention.

The trusted content handler (TCH) is a transparent extension to the content viewer that is responsible for feeding the viewer with protected content. It is considered transparent to the viewer because it does not require special modification or even re-compilation of the viewer code. It leverages prevailing software structuring mechanisms commonly known as component technologies. Most new software systems are composed out of a set of independent components with well-defined interfaces. Such systems are typically extendable by means of adding or replacing some of the components. These are post-installation changes that do not require re-compilation of the software. TCH takes advantage of this aspect of new software systems in order to transparently augment existing Web browsers, or content viewers in general, with rights management capabilities. The only requirement imposed on the viewer is to be extendible in a very common way; it must provide a mechanism for attaching independently developed content handlers (a.k.a. protocol handlers). FIG. 6 illustrates the main modules, which comprise the TCH. The function of each module is described below.

The trusted content handler is composed of the following modules:

Authenticator

Upon receiving a request from the viewer/browser rendering engine for right protected content, the authenticator is invoked to verify that the requesting application has been indeed authorized to access protected content, by the verification system. The section "Code Identity Verification" below describes two mechanisms for performing such authentication.

Name Resolver

Once authenticated, the first step in honoring the viewer's request is to obtain the rights associated with the requested resource object. The requested resource is referenced using a resource identifier. The uniform resource locator (URL) is the most commonly used resource identifier, and will be used here as an example for a resource identifier. The URL should contain enough information to derive the location of both the resource and the set of rights (a specific rights file) associated with it.

One way to structure the URL is to specify a hierarchical name for the resource that includes a package name and a relative path to the resource within the package. In this case, the URL has the following form: <protocol name>://<package path>/<package name marker><package name>/<resource relative name>, where the <package name marker>is a constant used to aid the parser in identifying the package name. E.g., rmhttp://....../PackageMark_P1/...... In this case, the protocol is rmhttp and the package name in P1. Given the package name, a content map associated with the package is retrieved. The content map is a hashing table that associates specific rights files and keys with subsets of the resources included in the package.

Rights Parser

The rights parser responsibility is to parse the rights file associated with a certain resource and retrieve the rights granted to the user with respect to that resource. Basic read access rights are checked before permitting the object reader from proceeding to retrieve the resource. Other rights may be communicated if necessary to a UI control module, which may be needed with some viewers to ensure that the user interaction with the viewer does not violate the acquired rights.

Object Reader

This module is responsible for the actual retrieval of the resource. It utilizes the services of the decryption module and streams the decrypted content to the viewer.

Decryption Module

This module hosts the cryptography algorithms used by the object reader to decrypt the content. It interacts heavily with the key manager to obtain the decrypting keys.

Key Manager

The key manager manages a key database, which houses a set of keys used to decrypt the different resources and rights files within a content package. The key database itself is protected using a key, which is specific to the user machine on which it is installed. Thus, illegal copying of the content package to another machine is useless.

Content Handling Flow

Figure 7:
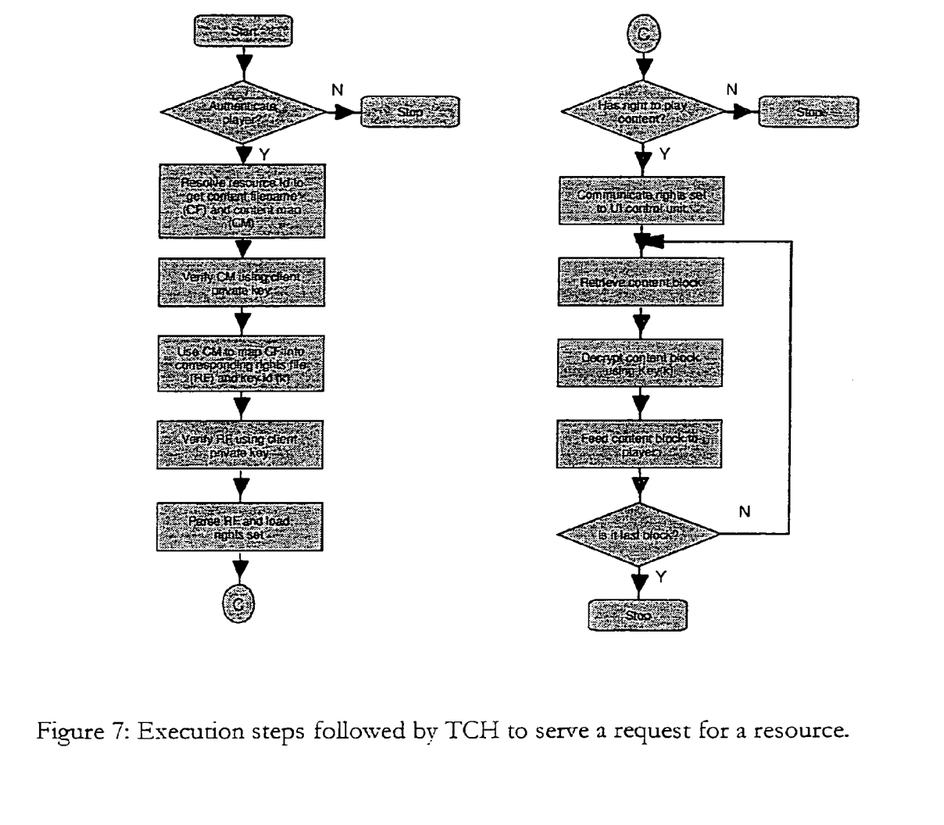
FIG. 7 illustrates the execution steps followed by the trusted content handler to serve a request for a resource.

The interactions among these different modules can be better understood by studying the sequential flow of operations to honor a resource request. The flow chart depicted in FIG. 7 illustrates the steps followed by TCH to serve a request for a resource.

The code of TCH includes modules which manage decryption keys, decrypt content, and handle rights, therefore this code is preferably obfuscated and executed within a tamper-resistant environment that defeats any potential hackers' debugging attacks. There are many published tamper resistance techniques that may be applied.

User Interface Control Module

Users may obtain different right sets for the secure documents they browse. According to the right set they obtain, they should or should not be able to perform operations such as Print, Save, Copy, Cut & Paste, Save-As, etc., on these documents. Given that users use off-the-shelf standard browsers, it is desirable to extend the browsers' functionality, by controlling what is allowed or disallowed from the browser's user interface commands. This control may be performed dynamically according to the right set associated with the currently loaded document. User Interface Control includes controlling: Hot Keys (Shortcut Keys) as in Ctrl-C for Copy, Menu Bar options as Save as under the File menu, Tool Bar, and Pop Up Menu options.

Since the standard method for handling the user activities and user requests to any application in Windows operating systems is by sending messages to the application containing the command requested by the user. Because of this, the present invention, by intercepting the messages sent to the browser, and filtering them appropriately, can achieve the required controlled behavior.

Filtering UI Messages Using Window Subclassing

Each application in Windows systems has a main procedure, WinProc, which is called by the windows system to handle the application's messages. The address of this procedure is stored in the application window's class information structure. This structure is valid only while the application process is running. The address of the window procedure WinProc is stored in a specific position in that structure. By window subclassing, this invention can replace the WinProc address in that structure by a new procedure. To subclass the current window, the preferred embodiment of this invention calls:

SetWindowLong(hwnd, GWL_WNDPROC, (LONG) (NewWndProc))

Where hwnd is the handle of the window we want to subclass, GWL_WNDPROC indicates that we need to change the WndProc information in that structure, and NewWndProc is the address of the procedure that is used to replace the original WndProc. The original WinProc address is stored in order to pass the valid messages to it to be processed in a normal way. Here the preferred method of this invention only subclassed this particular window which means if a new window, from the same class of the subclassed window, will be created, then we have to subclass it again. To make that done transparently, we have to subclass the window class of interest, not the individual window instances. In this case, whenever a new window is created, it copies the information of its class to its local structure; and since the class information contains the address of the new WndProc, that window will be automatically subclassed without any further processing. The function called, in order to subclass the window class, is:

SetClassLong(hwnd, GCL_WNDPROC, (LONG) (NewWndProc))

Application Window Hierarchy

In this section, we describe subclassing as applied to the Microsoft Internet Explorer (IE) Web browser. It should be noted, however, that the concepts and methods explained here are general and applicable to any other browser or Windows application that exposes a GUI to the user.

Figure 8:
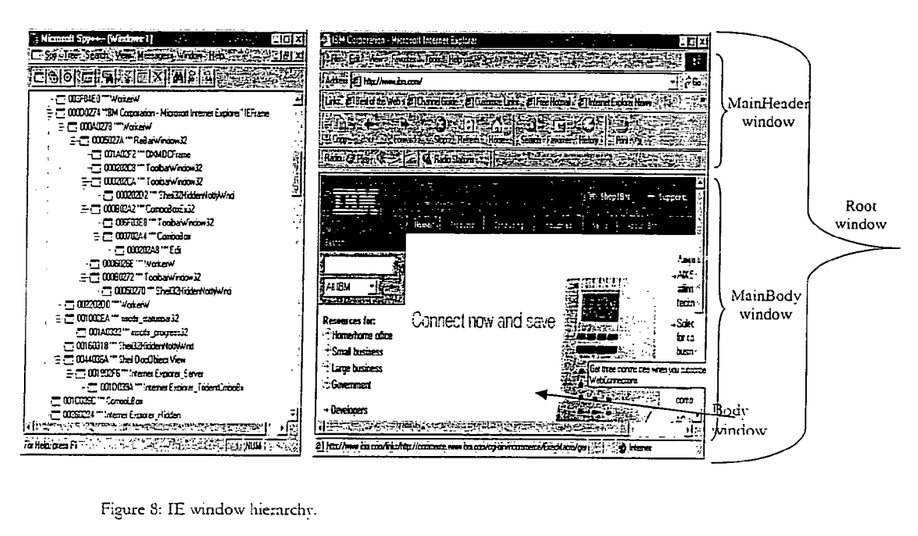
FIG. 8 shows an example of a windows application and illustrates its windows hierarchy.

The structure of IE browser application contains multiple windows. A user can enumerate these windows by a simple spying tool such as Microsoft Spy++. FIG. 8 shows an example of IE windows and the corresponding windows structure as shown by Spy++.

From the above structure, the most important windows for the preferred method of this invention are: Root window: in the above Spy structure, it is named by ("IBM Corporation—Microsoft Internet Explorer" IEFrame). This is the main window of the browser.

MainHeader window: Named by (""WorkerW), is the window that contains all the subwindows in the upper part of IE. This includes the menu bar window, tool bar window, radio bar window, channels window, address bar window, etc.

MainBody window: Named by (""Shell DocObject View). It contains the other subwindows that show the current page or pages if there are multiple frames.

Body window: Named by (""Internet Explorer_Server). It represents the window that shows the current page. This window may have other children according to the structure of the page the user browses. For example, in the above page there is a drop down selection window named by (""Internet Explorer_TridentCmboBx).

It should be noted that there are many other windows in the IE structure like the Status Bar window. For purposes of this invention, we just need to focus on the above windows since they are the windows we need to subclass in order to intercept the messages of interest, as will be described below.

Intercepted Messages

In order to find out exactly what exact messages a user wants to intercept and in which exactly window the user should intercept them, the user may use a spying tool, such as Microsoft Spy++. From the Messages option under Spy menu, the user can see any kind of messages sent to a specific window(s). Therefore, to intercept the Ctrl+C hot key, the user would watch the messages send to Body Window and then press Ctrl+C and see what message and what parameters have been sent to that window. The following table shows the messages that are of current interest in the practice of the preferred embodiment of this invention.

Table of important messages to intercept in IE

| Function | Action | Target Window | Message | wParam |
|---|---|---|---|---|
| Copy | HotKey (Ctrl+C) | Body Window | WM_COMMAND | 0x0001000F |
|  | Menu selection | Root Window | WM_COMMAND | 0x000A042 |
|  | Menu selection | MainBody Window | WM_COMMAND | 0x000A042 |
| Print | HotKey (Ctrl+P) | Body Window | WM_COMMAND | 0x0001001B |
|  | Menu selection | Root Window | WM_COMMAND | 0x00000104 |
|  | Menu selection | MainBody Window | WM_COMMAND | 0x00000104 |
| Save As | HotKey (Ctrl+S) | Body Window | WM_COMMAND | 0x00010101 |
|  | Menu selection | Root Window | WM_COMMAND | 0x00000102 |
|  | Menu selection | MainBody Window | WM_COMMAND | 0x00000102 |
| Sent page by email | Menu selection | Root Window | WM_COMMAND | 0x0000011A |
|  | Menu selection | MainBody Window | WM_COMMAND | 0x0000011A |
| Copy, Save, Print . . . | Tool Bar selection | MainHeader window | WM_COMMAND | >0x000003FA & <0x00010000 |
| Copy, Save, Print . . . | Pop Up Menu | Body Window | WM_CONTEXTMENU |  |

Data Structures

Two main data structures are used by the UI control module:

App_Windows: This data structure stores the information about the current windows of the controlled application, and the addresses of the old WndProc functions replaced for these windows.

Window_Rights: This data structure stores the rights sets for the existing windows indexed by the window's handles. This is needed for handling multiple frames per page where each frame has a different rights set. It is also needed for handling multiple open windows, each having a different right set, belonging to the same application instance.

Activating UI Filter

The user interface control module may be implemented as a DLL with a single interface function:

int UIControlSetRights(HWND hwnd, char *RightsFile)

This function should preferably be called whenever a protected page is loaded in order to set the rights set for it. Since the component responsible for loading protected pages is the trusted content handler (protocol handler), the protocol handler invokes this routine whenever it loads a protected page. The protocol handler passes the name of the rights file associated with the page to the function.

Alternatively, it can pass the rights set class instead of the file name if the file was already parsed. Also, the above function receives the handle (hwnd) of the current active window. This is needed for supporting multiple windows or multiple frames per window, where each window or frame may have a different set of rights associated with it. When this function is called for the first time, it builds the App_Windows data structure. Then it starts subclassing each window with the new WndProc.

Intrusion Detection

Using the same method of subclassing, described herein, an intruder could attempt to disable the security model by re-subclassing the windows which we already subclassed. This way, the intruding program can intercept the window messages before the new WndProc receives them. Then the intruder could pass these messages to the original WndProc of the controlled application (e.g., IE). So the application will retain the normal behavior and the new security model is decapitated. In order to prevent this, the preferred embodiment of this invention may either prevent any additional subclassing for the windows we subclassed, or detect any such additional subclassing and terminate the application immediately. Preferably, we implement the latter method in our UI control module.

To detect intrusive subclassing, we perform a periodic test on the WndProc fields in the current windows of the controlled application and their corresponding classes. The values of these fields should be equal to the address of our new WndProc function. If the values differ, then there is an intruder who replaced our filtering module, thus the application is terminated immediately.

Fine-Grained Rights Specification for Large Protected File Sets

Rights specification for protected packages containing large numbers of individual content items—e.g., courseware, photography collections, literature anthologies—presents issues not addressed by existing rights management systems. First of all, there must be the ability to specify rights at a fine granularity. This is important in enabling content owners and distributors to offer consumers a variety of ways to purchase content in these large packages, and in giving consumers choice in how they purchase it. But rights specification must also be convenient—it should not be necessary to specify rights individually for each item of content. Finally, there should be an efficient run-time mechanism, both in speed and in storage requirements, for associating a particular item of content with its corresponding set of rights. Meeting these requirements is achieved with the system described herein.

Rights Specification Files

A complete rights specification for a protected package is comprised of (1) one or more rights files, (2) a key-table file, and (3) a content-attributes-table file. These files are collected together in one directory, the directory having the same name as the package name.

Rights Files

Rights files are text files with the ".ini" extension. A package may have multiple rights files but must have at least one.

The format of a rights file is a series of lines, each line granting or denying one right. Example:

Play: yes
Print: no
Save: no
Clip: no

Key Tables.

A key table is a text file with the name "keytable.ini". Following is a sample key table.

[Version]
0.1
[Parameters]
Algorithm: RC4
NumberOfKeys: 7
[Keys]
0123456789
ABCDEF0123
456789ABCD
EF01234567
89ABCDEF01
23456789AB
CDEF012345

Keys are specified in hexadecimal format, and preferably have an even number of digits. (This may be verified by the packager.) The keys in the sample each have 10 digits, and are thus 5 bytes, or 40 bits, long. At this time, RC4 is the only algorithm supported.

Content-Attributes Tables.

A content attributes table (also referred to as content map) associates content items with rights files and decryption keys, in a compact and efficient way. Conceptually, it is structured as in the table below.

| Content Attributes Table (Conceptual) | | |
|---|---|---|
| File specifier | Rights | Key |
| file1 | RightsSetFile1 | 4EF872A349 |
| .../Section 1/* | Section1Rights | 9B3DA89C01 |
| .../Section 2/* | Section2Rights | 0F311D42BA |
| ... | ... | ... |

A content-attributes table is a text file with the name "contentattrs.ini". The role of the content-attributes table is to assign rights files and decryption keys to individual content items in a compact and efficient way. Following is a sample content-attributes table.

[*]
RightsFile: default_rights.ini
KeyId: 0
[Andrew_Jackson.htm]
RightsFile: AJ_rights.ini
KeyId: 1
[Andrew_Jackson_files/*]
RightsFile: AJ_rights.ini
KeyId: 2
[Jacksons_Hermitage.htm]
RightsFile: JH_rights.htm
KeyId: 3
[Jacksons_Hermitage_files/*]
RightsFile: JH_rights.htm
KeyId: 4

The content-attributes table is a series of content-path specifiers (within '[' and ']' brackets) followed by rights-file and key assignments. Content-path specifiers are relative to the parent directory of the course. Thus, for a file named "D:\packages\RMHTTP_PACKAGE_ROOT_DB2Demo\index.html", the content-path specifier in the content-attributes table is "index.html".

So that not every file in a package requires its own specification line, the content-attributes table allows hierarchical specification. In the sample above, "[Andrew_Jackson_files/*]/" specifies all the files in the directory "Andrew_ Jackson_files". The "*" element is only used to indicate all files in a directory; it cannot be used as a general wildcard. That is, *.html cannot be used to indicate all files with the html extension.

It may be noted that the directory separator used is "/", following URL syntax.

It can be seen in the sample above that a given file path name may match more than one path specification. For example, Andrew_Jackson.html matches both [*] and [Andrew_Jackson.html]. The rule is that specification with the longest matching prefix is chosen. This makes it possible to assign a default rights file and then override it for selected files.

Key Ids refer to the index of the key in the key table. The index is zero-based.

It should be noted that it may be more efficient to separate rights-file assignment and key assignment into two separate tables, rather than combining the two into one table.

Time Complexity of Rights-File and Key Lookup

Since prefix matching is strictly on the basis of whole path elements, the time complexity of any one rights-file and key lookup (i.e., given a file name, the time required to look up the associated rights file and decryption key) is linear in the length, in path elements, of the file name. For example, "[index.html]" has one path element, and "[Andrew_Jackson_files/*]" has two. Since the depth of a tree of n nodes is proportional to $\log_2(n)$, the time complexity of rights-file and key lookup in a package of n content items is O(lg n).

Content Packaging

After the rights specification files—the rights files, a key table, and a content attributes table—have been prepared, a packaging tool encrypts the content files for distribution, using the keys specified in the key table and the content attributes table. The rights specification files are also encrypted with a secret key, and remain encrypted while on the user's system. (They may or may not undergo a transcription when they are first copied to a user's system.)

Because the names of the content files and rights specification files, and their organization in directories, is not protected against tampering, some users may attempt to circumvent the rights management system by renaming rights files and/or content files. Seeing a file named "NoRights.ini" and a file named "AllRights.ini", a user may be tempted to delete the NoRights.ini file, then make a copy of the AllRights.ini file and name it to NoRights.ini. The obvious intent would be that any content assigned the rights in NoRights.ini would effectively have the rights in AllRights.ini.

To prevent this, the packager may insert into each rights specification file and content file, at encryption time, its name. (For rights specification files, the name is relative to the package's rights-specification directory; for content files, the name is relative to the content root directory.) When one of these files is accessed, the name used to access the file is checked against the name embedded in the file itself. If the names do not match, the file is not decrypted.

A Simple, Complete DRM System

In this section, we discuss one possible implementation of a simple, complete DRM system. The main functions of this DRM server are: end-user registration, rights acquisition and personalization, and content hosting.

End-User Registration

The only entity that is not trusted in this simplified system is the end-user. Therefore a client registration system must be established. After installing the DRM system on the client machine, and before the client can perform any transactions, the client has to register with the DRM server. Besides typical registration procedures to any online store, which result in the generation of a user ID, password, and possibly a client profile for accessing the Web site and ordering content, the DRM server receives from the DRM client a unique public key certificate. This public key certificate is generated by a registration application, which is triggered on the client side. The counterpart private key of this public key is maintained securely protected by the client DRM system. The secret used to protect that key is generated based on unique features of the client machine, and is never stored on disk. The code that generates this secret and uses it is part of a DRM library, which is used by the different DRM client-side components, such as the trusted content handler, the launcher, and the registration application. The code of this DRM library is preferably obfuscated and well-protected against tampering or debugging attacks.

Any content directed to this client is protected using the public key which is stored on the DRM server. As will be discussed in greater detail below, public key encryption is preferably applied only to metadata such as the rights files or the content map in order to avoid the overhead of asymmetric encryption/decryption with each content download.

Figure 9:
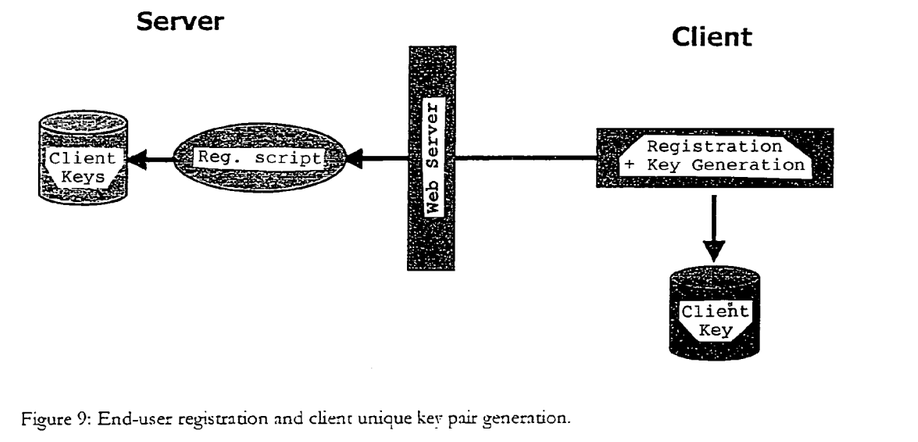
FIG. 9 illustrates the registration procedure and shows the registration application.

FIG. 9 illustrates the registration procedure, and shows the registration application, which runs on the client side, as well as the registration CGI script which is executed on the DRM server side.

Rights Acquisition and Personalization

In a typical heavyweight DRM system, as the one described in FIG. 1, the last step in the rights acquisition phase involves a Clearinghouse giving the final authorization to the client to unlock the downloaded content. This authorization (sometimes referred to as the license to use the content) is personalized for a specific client machine by using the public key of that machine to encrypt the authorization token (or the license).

Since a separate Clearinghouse entity does not exist in the lightweight DRM system, the personalization of authorizations to specific client hosts may be performed by the DRM server. This personalization is done using the client public key, which the server obtained from the client during the registration process. The server uses the client public key to encrypt the content metadata. The metadata include the rights files, the content map, and keys database. It should be noted that while the keys database must be encrypted, the rest of the metadata may be signed only to ensure its integrity and authenticity.

Figure 10:
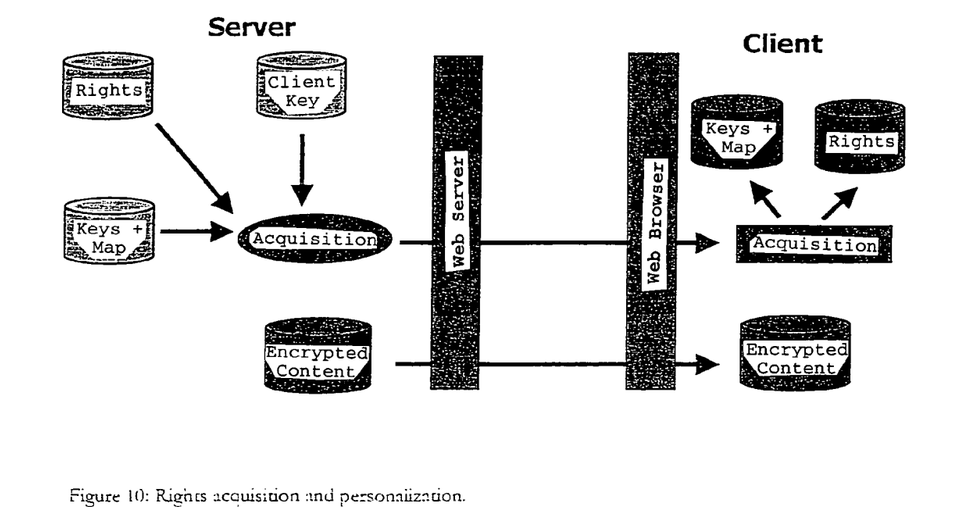
FIG. 10 illustrates rights acquisition and personalization.

FIG. 10 illustrates the interactions, which occur during the acquisition phase. On the server side, an acquisition script performs the asymmetric encryption/signature of the metadata and packages it in a specific mime type. Upon receiving the metadata package, the Web browser triggers an acquisition application on the client side, which stores the metadata in the appropriate location(s) on the client machine to be accessed later by the trusted content handler during playback.

Content Hosting

In addition to the above two important functions of the DRM server, it may perform the task of content hosting. This task merely requires the provision of suitable disk storage capacity, and appropriate Web server configuration for best performance based on the expected number of simultaneous downloads. In the system of FIG. 10, it was assumed that the server performs this task.

Figure 11:
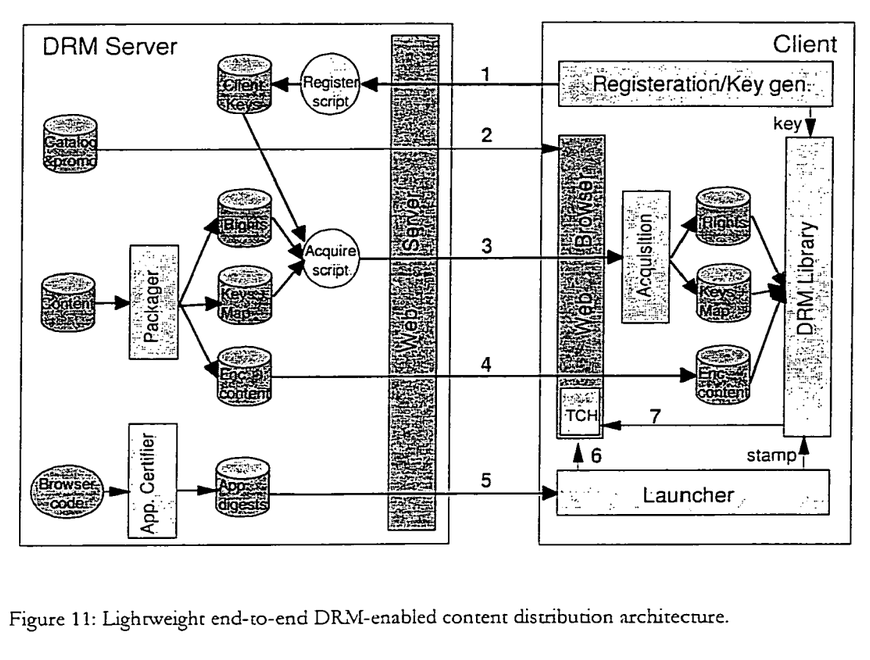
FIG. 11 depicts an overall end-to-end DRM enabled content distribution architecture.

Besides the above-mentioned DRM-related functions of the server, it may also provide the typical Web-based portal services including advertisement of the content offerings, catalog browsing and shopping, and acceptance of online payments. FIG. 11 shows all the pieces put together, and depicts the overall end-to-end lightweight DRM-enabled content distribution architecture. The DRM library shown on the client side encloses all the cryptography, keys, and rights handling sensitive operations that are shared by the different client-side components (Launcher, TCH, and Registration modules). The object code of the DRM library is preferably obfuscated and should be resistant to tampering and debugging attacks.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A digital rights management system for controlling the distribution of digital content to player applications including a core rendering application and an extension mechanism, the system comprising:
 a verification system to validate the integrity of the player applications, and including a certificate generator for generating a certificate after inspecting the player application code and determining that a certain required property has been met by said code;
 a trusted content handler to decrypt content and to transmit the decrypted content to the player applications, using the extension mechanism of the player application, and to enforce usage rights associated with the content; and
 a user interface control module to ensure that the user interaction with the player applications does not violate the usage rights by intercepting and filtering messages sent from the user to the player application in accordance with a user rights set obtained by the user;
 wherein components of the verification system, the trusted content handler, and user interface control module of the digital rights management system operate independently from the player application, reside locally in an end-user device having said player applications, and are dynamically linked to the applications at run-time; and
 wherein the digital rights management system uses the extension mechanism of the player applications to implement the functions of the digital rights management system without modifying the core rendering applications of the player applications.

2. A digital rights management system according to claim 1, wherein the verification system includes an off-line verifier to verify that the player applications have certain properties, and to issue trust certificates to verify that the player applications have said properties.

3. A digital rights management system according to claim 2, wherein the verification system further includes a verifying launcher for verifying that a particular player application is certified as a trusted application before digital content is transmitted to said particular player application.

4. A digital rights management system according to claim 1, wherein the player applications request protected content, and the trusted content handler includes an authenticator to verify that a player application that requests protected content has been authorized by the verification system to access the requested, protected content.

5. A digital rights management system according to claim 1, wherein a user interface control module traps user interface related messages generated as a result of user interactions with player applications, blocks messages that lead to usage rights violations, and passes through other messages to the player applications.

6. A digital rights management method for controlling the distribution of digital content to player applications including a core rendering application and an extension mechanism, the method comprising the steps:
providing a verification system to validate the integrity of the player applications, said verification system including a certificate generator for generating a certificate after inspecting the player application code and determining that a certain required property has been met by said code;
using a trusted content handler to decrypt content and to transmit the decrypted content to the player applications, using the extension mechanism of the player applications, and to enforce usage rights associated with the content; and
providing a user interface control module to ensure that the user interaction with player applications does not violate the usage rights by intercepting and filtering messages sent from the user to the player application in accordance with a user rights set obtained by the user;
wherein components of the verification system, the trusted content handler, and user interface control module of the digital rights management system operate independently from the player application, reside locally in an end-user device having said player applications, and are dynamically linked to the application at run-time; and
wherein the digital rights management system uses the extension mechanism of the player applications to implement the functions of the digital rights management system without modifying the core rendering applications of the player applications.

7. A method according to claim 6, wherein the step of providing a verification system includes the step of providing an off-line verifier to verify that the player applications have certain properties, and to issue trust certificates to verify that the player applications have said properties.

8. A method according to claim 7, wherein the step of providing a verification system further includes the step of providing a verifying launcher for verifying that a particular player application is certified as a trusted application before digital content is transmitted to said particular player application.

9. A method according to claim 6, wherein the player applications request protected content, and the step of using the trusted content handler includes the step of using an authenticator to verify that a player application that requests protected content has been authorized by the verification system to access the requested, protected content.

10. A method according to claim 6, for controlling the distribution of digital content to the player applications when said player applications are installed on end user devices, and wherein:
the step of providing a verification system includes the step of employing the verification system to use a specified verification process to validate the integrity of the player applications and without requiring the player applications to participate in the verification process while the player applications are installed on the end user devices; and
comprising the further steps of:
one of the end users generating a public key/private key pair, registering with a digital rights management server, and sending the public key to said server;
said server using said public key to encrypt a rights file and a content map, and then sending the encrypted rights file and content map to said one of the end users; and
said one of the end users using the private key to decrypt said encrypted rights file and content map.

11. A program storage device readable by machine, tangibly embodying a program of instructions executable by the machine to perform method for controlling the distribution of digital content to player applications including a core rendering application and an extension mechanism, the method steps comprising:
using a verification system to validate the integrity of the player applications, said verification system including a certificate generator for generating a certificate after inspecting the player application code and determining that a certain required property has been met by said code;
using a trusted content handler to decrypt content and to transmit the decrypted content to the player applications, using the extension mechanism of the player applications, and to enforce usage rights associated with the content by intercepting and filtering messages sent from the user to the player application in accordance with a user rights set obtained by the user; and
using a user interface control module to ensure that the user interaction with player applications does not violate the usage rights;
wherein components of said verification system, the trusted content handler, and user interface control module operate independently from the player applications and reside locally in an end-user device having said player applications, and are dynamically linked to the applications at run-time; and
wherein the digital rights management system uses the extension mechanism of the player applications to implement the functions of the digital rights management system without modifying the core rendering applications of the player applications.

12. A program storage device according to claim 11, wherein the step of using the verification system includes the step of using an off-line verifier to verify that the player applications have certain properties, and to issue trust certificates to verify that the player applications have said properties.

13. A program storage device according to claim 12, wherein the step of using the verification system further includes the step of using a verifying launcher for verifying that a particular player application is certified as a trusted application before digital content is transmitted to said particular player application.

14. A program storage device according to claim 11, wherein the player applications request protected content, and the step of using the trusted content handler includes the step of using an authenticator to verify that a player application that requests protected content has been authorized by the verification system to access the requested, protected content.

15. A code identity and integrity verification system for verifying the integrity or code of player applications including a core rendering application and an extension mechanism, comprising:
   a certificate generator for receiving the player applications, for inspecting the player applications code to determine if the player applications code exhibit a predefined property, and for issuing a trust certificate for each of the player applications that exhibits the predefined property;
   a certificate repository for receiving and storing trust certificates issued by the certificate generator;
   an off-line code verifier for to analyze program code of a particular player application to determine whether said particular player application is certified as a trusted application before digital content is transmitted to said particular player application; and
   an authenticator for receiving requests, using the extension mechanism of one of the player applications, to verify that said one player application that requests protected content has been authorized by the verification system to access the requested, protected content, wherein the authenticator operates independently from said applications, resides locally in an end-user device having said applications, and is dynamically linked to said applications at run-time; and
   wherein the authentication uses the extension mechanism of said one player application to implement the functions of the authenticator without modifying the core rendering application of said one player application.

16. A code identify and integrity verification system according to claim 15, wherein the code verifier is responsible for launching the player application and verifying the identity and integrity of the code using the information in the trust certificate before launching the application; the launch procedure returning process identification information, which the code verifier records internally; the authenticator communicating the same or other process identification information concerning its own process, which it obtains from system service calls, to the code verifier at the time the application requests content from the authenticator; the code verifier matching this process identification information against the process identification information it recorded; the code verifier returning a code indicating whether the process was verified or not.

17. A code identity and integrity verification system according to claim 15, wherein the code verifier receives from the authenticator process identification information at the time the player application calls the authenticator; the code verifier querying the operating system with the process identification information or the file names of all modules loaded for that process; the code verifier using the information in the trust certificate to verify the identity and integrity of the code modules; returning a code indicating whether the process was verified or not.

18. A code identity and integrity verification system according to claim 15, wherein the trust certificate includes:
   a program identifier identifying said one of the applications;
   a property name identifying an attribute certified by the trust certificate;
   a code digest of the one application;
   a digital signature containing a secret key of the application certifier; and
   a certifier identification containing a public key of the application certifier.

19. A method for verifying the identity and integrity of code of player applications including a core rendering application and an extension mechanism, the method comprising the steps:
   using a certificate generator for receiving the player applications, for inspecting the player applications code to determine if the player applications code exhibit a predefined property, and for issuing a trust certificate for each of the player applications that exhibits the predefined property;
   receiving and storing in a certificate repository trust certificates issued by the certificate generator;
   using an off-line code verifier to analyze program code of a particular player application to determine whether said particular player application is certified as a trusted application before digital content is transmitted to said particular player application; and
   using an authenticator for receiving requests, using the extension mechanism of one of the player application, to verify that said one player application that requests protected content has been authorized by the verification system to access the requested, protected content, wherein the authenticator operates independently from said applications, resides locally in an end-user device having said applications, and is dynamically linked to said applications at run-time; and
   wherein the authentication uses the extension mechanism of said one player application to implement the functions of the authenticator without modifying the core rendering application of said one player application.

20. A method according to claim 19, wherein the trust certificate includes:
   a program identifier identifying said one of the applications;
   a property name identifying an attribute certified by the trust certificate;
   a code digest of the one application;
   a digital signature containing a secret key of the application certifier; and
   a certifier identification containing a public key of the application certifier.

21. A program storage device readable by machine, tangibly embodying a program of instructions executable by the machine to perform method steps for verifying, out of process, the identity of code of player applications including a core rendering application and an extension mechanism, said method steps comprising:
   using a certificate generator for receiving the player applications, for determining if the player applications exhibit a predefined property, and for issuing a trust certificate for each of the player applications that exhibits the predefined property;
   receiving and storing in a certificate repository trust certificates issued by the certificate generator;
   using an off-line code verifier to analyze program code of a particular player application to determine whether said particular player application is certified as a trusted application before digital content is transmitted to said particular player application; and using an authenticator for receiving requests, using the extension mechanism of one of the player application, to verify that said one player application that requests protected content has been authorized by the verification system to access the requested, protected content, wherein the authenticator operates independently from said applications, resides locally in an end-user device having said applications, and is dynamically linked to said applications at run-time; and wherein the authentication uses the extension mechanism of said one player application to implement the functions of the authenticator without modifying the core rendering application of said one player application.

* * * * *